United States Patent
Driesen et al.

(10) Patent No.: US 8,875,122 B2
(45) Date of Patent: Oct. 28, 2014

(54) TENANT MOVE UPGRADE

(75) Inventors: Volker Driesen, Walldorf (DE); Lars Spielberg, St. Leon-Rot (DE); Peter Eberlein, Malsch (DE); Andrey Engelko, Karlsruhe (DE); Joerg Schmidt, Sinshein (DE); Thomas Vogt, Neustadt a.d.W. (DE)

(73) Assignee: SAP SE, Walldorf (DE)

(*) Notice: Subject to any disclaimer, the term of this patent is extended or adjusted under 35 U.S.C. 154(b) by 767 days.

(21) Appl. No.: 12/982,747

(22) Filed: Dec. 30, 2010

(65) Prior Publication Data

US 2012/0174085 A1 Jul. 5, 2012

(51) Int. Cl.
G06F 9/44 (2006.01)
G06F 9/445 (2006.01)

(52) U.S. Cl.
CPC .................................. *G06F 8/65* (2013.01)
USPC ............................ 717/173; 717/168; 717/178

(58) Field of Classification Search
CPC ..... G06F 8/71; G06F 11/1464; G06F 3/1225; G06F 3/123; G06F 8/65; G06F 8/61; G06F 8/60; G06F 11/1433; G06F 15/177
See application file for complete search history.

(56) References Cited

U.S. PATENT DOCUMENTS

| | | | | |
|---|---|---|---|---|
| 6,606,744 B1 * | 8/2003 | Mikurak | ........................ | 717/178 |
| 7,124,289 B1 * | 10/2006 | Suorsa | ........................ | 717/173 |
| 7,743,147 B2 * | 6/2010 | Suorsa et al. | .................. | 717/173 |
| 8,434,060 B2 * | 4/2013 | Driesen et al. | ................. | 717/168 |
| 8,725,995 B1 * | 5/2014 | Kim et al. | ...................... | 717/174 |
| 8,739,151 B1 * | 5/2014 | Racz et al. | ...................... | 717/168 |
| 2004/0044703 A1 * | 3/2004 | Wildhagen et al. | ............ | 707/203 |
| 2007/0220121 A1 * | 9/2007 | Suwarna | ........................ | 709/220 |
| 2010/0211548 A1 * | 8/2010 | Ott et al. | ........................ | 707/655 |
| 2010/0262632 A1 * | 10/2010 | Jain et al. | ....................... | 707/809 |
| 2011/0161952 A1 * | 6/2011 | Poddar et al. | .................. | 717/173 |
| 2011/0258620 A1 * | 10/2011 | Gao et al. | ........................ | 717/178 |
| 2012/0174085 A1 * | 7/2012 | Driesen et al. | ................. | 717/168 |

OTHER PUBLICATIONS

Juniper Networks; Securing Multi-Tenancy and Cloud Computing; 2012; retrieved online on Jun. 16, 2014; pp. 1-5; Retrieved from the Internet: <URL: http://www.juniper.net/us/en/local/pdf/whitepapers/2000381-en.pdf>.*

Kyounghyun Park et al.; SaaSpia Platform: Integrating and Customzing On-Demand Applications Supporting Multi-tenancy; Feb. 2012; retrieved online on Jun. 16, 2014; pp. 961-964; Retrieved from the Internet: <URL: http://ieeexplore.ieee.org/stamp/stamp.jsp?tp=&arnumber=6174826>.*

Stefan Walraven et al.; A Middleware Layer for Flexible and Cost-efficient Multi-Tenant Applications; 2011; retrieved online on Jun. 16, 2014; pp. 360-379; Retrieved from the Internet: <URL: http://delivery.acm.org/10.1145/2420000/2414364/p360-walraven.pdf?>.*

* cited by examiner

*Primary Examiner* — Thuy Dao
*Assistant Examiner* — Hanh T Bui
(74) *Attorney, Agent, or Firm* — Mintz Levin Cohn Ferris Glovsky and Popeo, P.C.

(57) ABSTRACT

The current subject matter provides a method to upgrade an individual tenant by moving the individual tenant from a source computing system that implements an older software version to a target computing system that implements a newer software version. The movement of the individual tenant incorporates a movement of customer-specific data associated with the moved tenant. Instead of just upgrading a same multi-tenancy computing system implementing the tenant that needs to be upgraded, a new (target) multi-tenancy computing system implementing a newer software version is installed such that this tenant can be moved from the (source) multi-tenancy computing system to the new (target) multi-tenancy computing system. The data associated with the moved tenant is adjusted to new structures associated with the newer software version.

15 Claims, 7 Drawing Sheets

TENANT MOVE UPGRADE

TECHNICAL FIELD

The subject matter described herein relates to upgrading one or more tenants in a multi-tenancy computing environment, and more specifically, to the upgrading by moving the one or more tenants from a multi-tenancy computing system to an upgraded or newly installed multi-tenancy computing system with an advanced, newer or an upgraded software version.

BACKGROUND

In current multi tenancy systems, shared data is data that is used by all tenants. The shared data comprises the software of the platform product and runtime objects, shared monitoring data and the like. Each tenant has its own software data, metadata defining its processes, and business transaction data.

Conventionally, upgrading of all tenants of a multi-tenancy computing system are known, rather than upgrading of individual tenants. Thus, conventional upgrading a system operates on the system wide data (data shared in the system by all tenants) and on the data of each system. Conventional upgrade procedures cannot separately upgrade the shared data and the data of a single or several tenants, it always jointly upgrades the shared data and all data in all tenants. Tenant move operations may include moving one or all tenants from one computing system implementing a version of an enterprise application suite and associated data to another multi-tenancy computing system implementing the same version of the enterprise application suite and associated data. Herein, a version of enterprise application suite and associated data may also be referred to as a version of software, or a software version. In order to upgrade a computing system, the shared data is upgraded and the tenants are jointly upgraded. A conventional tenant operation procedure allows movement of a tenant from one computing system to another computing system only if the one computing system and the other computing system have the same software version.

However, there can be situations that require upgrading of an individual tenant rather than a collective upgrading of all tenants on a multi-tenancy computing system. But, an individual tenant upgrade is unknown for tenants of a multi-tenancy computing system. Until now, this can only be achieved as follows: move one tenant to a new system having no tenant yet and upgrading the new system with the moved-in tenant. Procedures such as these create high costs per tenant.

In some conventionally known implementations, customers are required to actively participate in the upgrade. Since a customer is involved in the upgrade, the timeslot where the upgrade shall take place needs to be planned individually for each customer. With the current upgrade procedure, where all tenant in one system are upgraded simultaneously with the upgrade of the system, customer individual upgrade scheduling is not possible.

During most such upgrades, manual implementations may result in many errors in tenant specific actions. Thus, in computing systems having a large number of tenants, the likelihood of a failure of the upgrade of a system including the simultaneous upgrade of all tenants increases dramatically. For example, for a computing system with 100 tenants to complete an upgrade of all the tenants all-at-once with a success rate above 90%, a failure rate for each tenant needs to be less than 0.1%.

SUMMARY

The current subject matter provides a method to upgrade an individual tenant by moving the individual tenant from a source computing system that implements an older software version to a target computing system that implements a newer software version. An advanced software version is implemented at the target computing system. This new software version on the target computing system may include a newer version of any one or more of database, kernel, ABAP basis software, and application software. The movement of the individual tenant incorporates a movement of customer-specific data associated with the moved tenant. Thus, instead of just upgrading a same multi-tenancy computing system hosting the tenant that needs to be upgraded, a new (target) multi-tenancy computing system implementing a newer software version is installed such that this tenant can be moved from the old (source) multi-tenancy computing system to the new (target) multi-tenancy computing system. The data associated with the moved tenant is adjusted to new structures associated with the newer software version. The movement of the tenant is accompanied by movement of the customer-specific data corresponding to the moved tenant. The proposed approach reduces costs by applying the upgrade activities for a single tenant upon the move of the tenant to a system having the higher version.

In one aspect, a computer-implemented method includes starting a tenant at a source computing system that implements a version of the software, and receiving, in response to a change of the version of the software, a request for an upgrade of the tenant. The method further includes stopping, in response to the received request, the tenant at the source computing system, and moving the tenant from the source computing system to a target computing system that implements a newer version of the software. The method further includes starting the moved tenant at the target computing system.

Articles are also described that include a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, the current subject matter allows upgrade of an individual tenant of a set of tenants implemented on a multi-tenancy computing system. Thus, an upgrade is possible for one client out of a system hosting even 100 or more clients. Each upgrade can individually complete without interference of errors associated with other tenants. During one tenant move upgrade, only the data of the single tenant is considered, thus runtime is a lot shorter than for a multi-tenancy computing system upgrade, in which all tenants implemented on the multi-tenancy computing system are upgraded simultaneously rather than individually. Further, the subject matter allows for customer individual downtime planning.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

One or more implementations of the current subject matter provide methods, systems, articles or manufacture, and the like that can, among other possible advantages, provide an upgrade of one or more tenants in a multi-tenancy computing environment.

Figure 1:
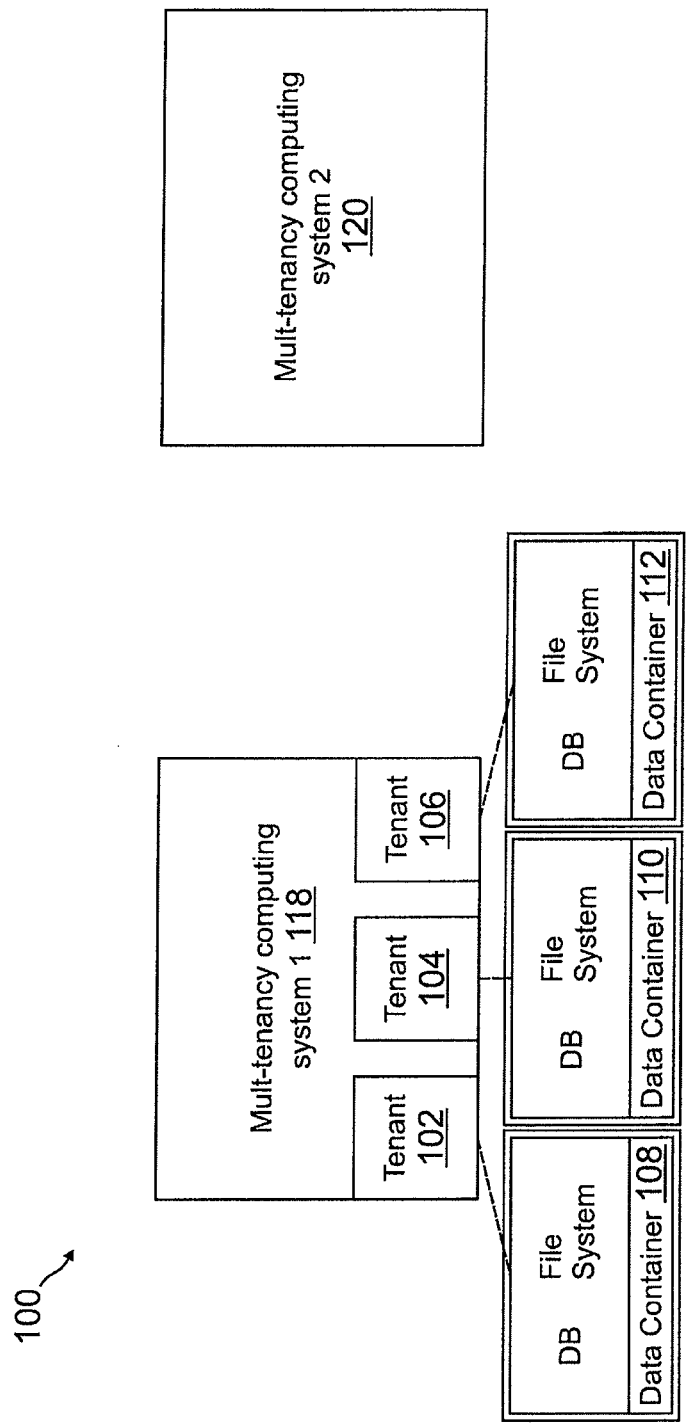
FIG. 1 illustrates a multi-tenancy landscape on which systems and methods described herein can be suitably employed.

FIG. 1 illustrates multi-tenancy landscape 100. In multi-tenancy landscape 100, multiple tenants 102, 104, 106 share a same programming language execution runtime of a single multi-tenancy computing system. In multi-tenancy landscape 100, a single instance of a software application running on a source computing system ("multi-tenancy computing system 1 (118)") serves multiple tenants. An example of the software application is "Business ByDesign (ByD)" by SAP. The multi-tenancy computing system may refer to a server hosting the software application. The tenants may refer to client systems at one of client organizations that access the software application and individual clients that access the software application. Therefore, the term tenant and client may be used interchangeably in the instant specification.

The tenants of multi-tenancy landscape 100 share the same application. In multi-tenancy landscape 100, each tenant works with a customized virtual application instance. Further, multi-tenancy landscape 100 includes other one or more multi-tenancy computing systems (e.g. "multi-tenancy computing system 2 (120)"), where each of the other one or more multi-tenancy computing systems is capable of serving one or more tenants.

Multi-tenancy allows different tenants (clients) 102, 104, and 106, to be hosted on a single, shared computing infrastructure. "System Data" refers to data that is stored in the system in shared tables and is accessed by all tenants. The hosting of multiple tenants 102, 104, and 106, all of which access a same instance of an application, on a same multi-tenancy computing system 118, allows an administrator (or hosting provider) to easily optimize administration, and minimizes cost of hosting multiple tenants and making applications available to the multiple tenants. The cost that is minimized is a total cost of ownership (TCO) for the hosting provider like SAP. The total cost of ownership includes return on investment, rate of return, economic value added, and return on information technology.

Figure 2:
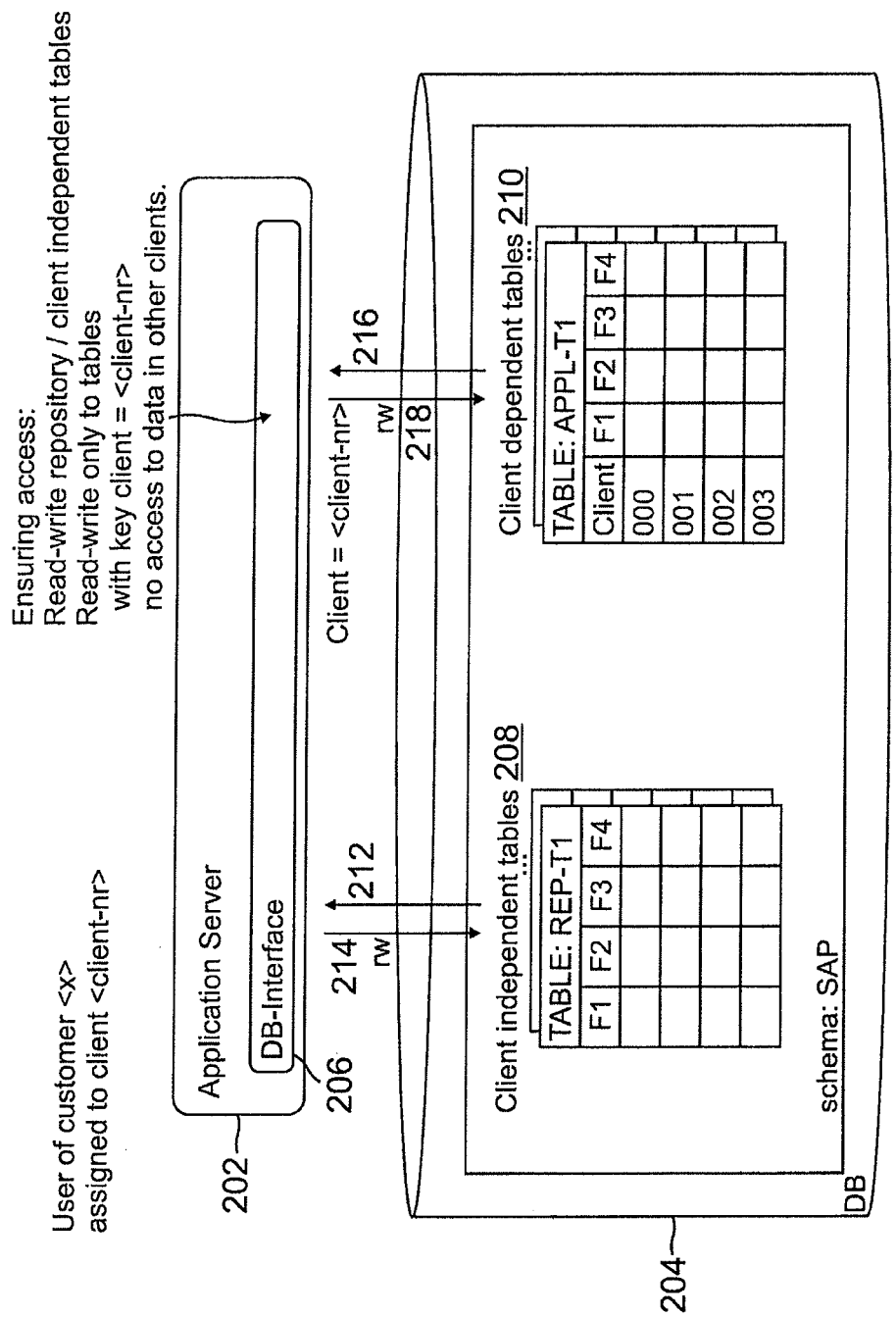
FIG. 2 illustrates persistency layers of a multi-tenancy environment.

FIG. 2 illustrates persistency layers of a multi-tenancy environment 100. The persistency layers include an application server 202 and a database 204. Application server 202 interacts with database 204 to access information using database interface 206. Database 204 includes client independent tables 208 and client dependent tables 210. The client independent tables 208 include all tables which hold shipped software, shipped content and default configuration. The client dependent tables 210 include tables which include customer-specific content. For example, client dependent tables 210 include user administration data, business data, business configuration, runtime data, log information and the like that is client dependent. The application server 202 may have both a read access 212 and a write access 214 to the client independent tables 208 via the database interface 206. Further, application server 202 may have both a read access 216 and a write access 218 to the client dependent tables 210 via the database interface 206.

When a user logs on to application server 202, the client that is to be used needs to be specified. Subsequently, the user may obtain a read only access 212 to the content of the client independent tables 208 and both a read access 216 and write access 218 to the content of the client dependent tables 210 for rows for which the key field "client" is equal to the "client-number" specified by the user.

For client independent tables 208, content can be stored according to two mechanisms viz. (1) namespace and (2) second table with client key-field, as described below:

(1) Namespace: A customer has write access 214 to the client independent tables 208 where the entries are separated by a namespace in one existing key-field e.g. the "name" field at SAP applications. For example, a customer entry named "cust-extension" is stored with the name "/<client-nr>/cust-extension" where client-nr is the namespace. Thus, the read access 212 of a customer is available for all entries of client independent tables 208, while the write access 212 is limited to the namespace of the client.

(2) Second table with client key-field: For tables where customers may store their own entries, a second table is created with the same structure, but with an additional first key field "client". For access to this second table, the same access rules associated with accessing application tables apply. A service provider uses this approach to assign one customer to one client. The application server 202 ensures that a customer is prevented from accessing data of a different client that is different than the client associated with the customer. Using the above approach, several customers can be given the same system (with different clients) while still ensuring that the data is strictly separated.

These features of a multi-tenant environment occur because the actions which have to be taken to manage the client-independent tables are required only once for each of the clients. For example, deployment of the new software, monitoring the system, database administration are required only once for all the clients. As a result of using the multi-client approach for different customers (or one customer that runs test and production tenants), lifecycle events targeting a system synchronously effect all customers using the system. For example, stopping of the application server 202 impacts all customers using the application server 202.

The currently presented upgrade procedure can be associated with a downtime of the one or more systems. The downtime refers to a time between stopping of a tenant on a source computing system 118 and starting of a tenant on a target computing system 120. In accordance with the above-described synchronous effect on customers, the downtime during an upgrade is synchronous for all customers in the multi-tenancy computing environment. If the above described synchronous effect approach is used for an on-demand offering, the downtime can hit customers spread all over the world at same times, which may not be suitable for customers in some parts of the world while may be suitable for customers in other parts of the world. For example, Saturday night in Europe is not a night time in USA or Asia, and Sunday is not a day off in the Middle East. Thus, different systems are required for different regions, thus increasing the number of systems and hence increasing costs.

For upgrades, where the downtime is usually long and customers need to be involved in the upgrade process, downtime might have to be negotiated with the customers. However, negotiation of a downtime window with different customers to find a slot suiting several customers can become complicated.

The target computing system 120, where the tenant is moved to, thus contains information regarding which specific data needs to be brought to the tenant. This specific data depends on the software version of the target computing system 120 and on the software version of the source computing system 118. The delta data needs to be imported to the tenant.

In the target computing system 120, a list is provided of all objects that are to be deployed to the tenant together with information, for which software version, associated with the object that is changed. For the move of a tenant from a system running a particular version (e.g. version 1) to a system running a different or upgraded version (e.g. version 3), the data which had been changed or created for the first version and any intervening version needs to be imported, whereas in the move of a tenant from a system running version 2 to a system running version 3, only the data changed or new to version 3 has to be deployed to the tenant. This list of objects is managed as follows: The lists of all objects include the following lists: (1) list of objects for the upgrade delta data (e.g. ByD 2.6-ByD 3.0, as provided by SAP), (2) list of objects of the deployed corrections (e.g. ByD 3.0 Patches 1 . . . x, as provided by SAP), and (3) list of objects of all add-ons installed on top of a product like Business ByDesign (ByD) by SAP (e.g. customer relationship management on-demand), and (4) list of all objects of the deployed corrections for these add-ons (e.g. customer relationship management on-demand 1.0 Patches 1 . . . x, as provided by SAP).

The above described information needs to be provided together with installation of the new multi-tenancy computing system. For all deployments of software packages to the new multi-tenancy computing system (e.g. patches and add-ons), the information needs to be aggregated: the list of objects which are new or changed compared to an older version is updated with each deployment of software to the system. The provision of information what has changed in the deployment of a software package together with the objects within the software packages is enabled by keeping the list of deployed software packages and their respective content.

During the tenant move upgrade, the transport tools (e.g. tp, r3trans, as implemented by SAP) are called to deploy the data only to the client which is currently upgraded. r3trans is the tool, that imports the objects to the DATABASEdatabase tables of the tenant. tp controls the import list calls r3trans to deploy certain objects described in the lists.

Further, the above-described transports include a call to a "post import data processing" (e.g. "after import method," as referred to by SAP) and a "data migration module" (e.g. "XPRA," as referred to by SAP, for example). Tp calls the "after-import-methods and XPRAs within the system.

Figure 3:
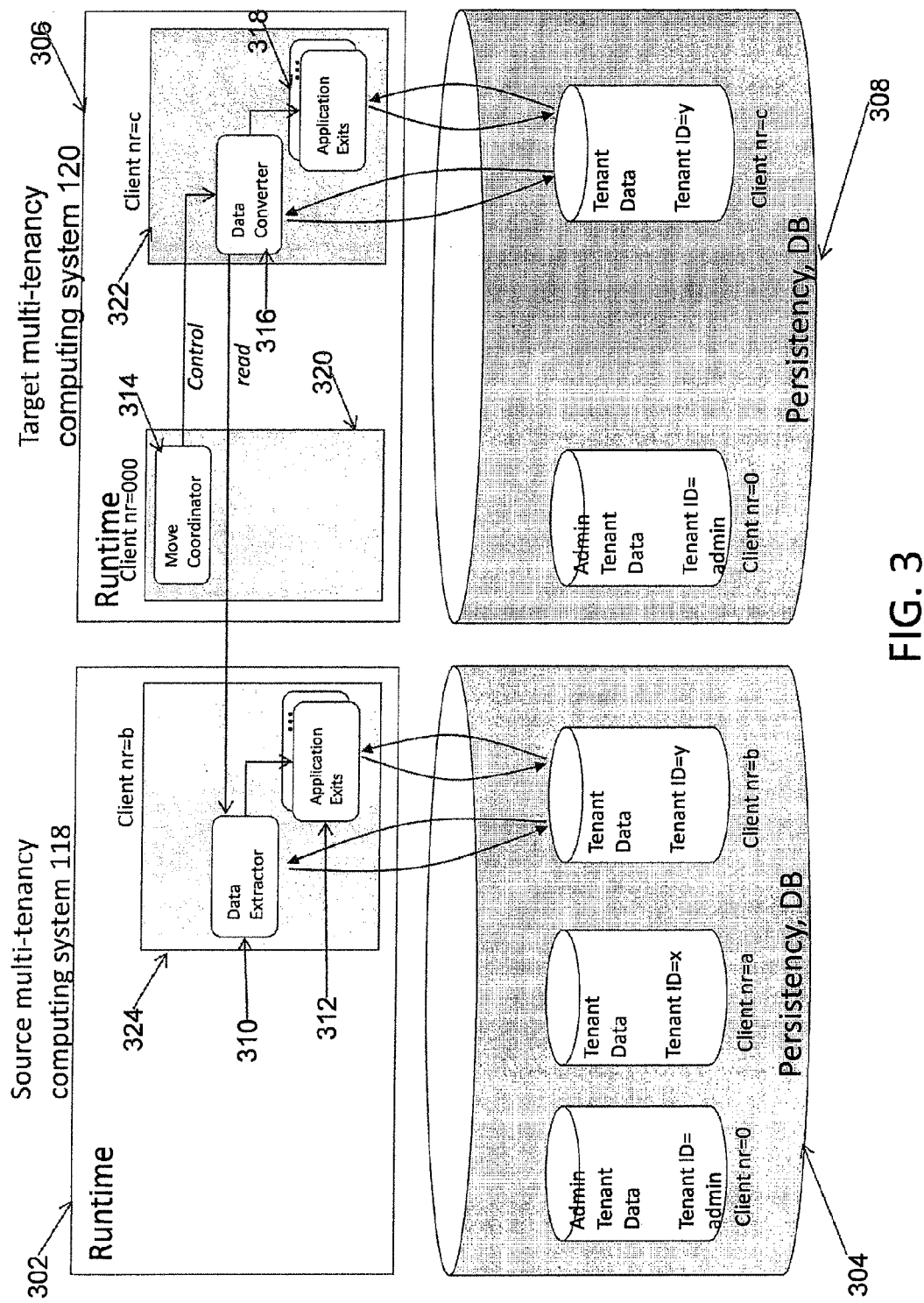
FIG. 3 illustrates components of the source computing system and a target computing system that can be used for movement of a tenant from the source computing system that implements an older version of software to a target computing system that implements a newer version of the software.

FIG. 3 illustrates components of the source computing system 118 and a target computing system 120 that can be used for movement of a tenant from the source computing system 118 that implements an application platform 402 associated with an older version 404 (e.g. version 2.0) of software to a target computing system 120 that implements an application platform 406' associated with a newer version 408 (e.g. version 3.0) of the software. Source computing system 118 is the system where the tenant is operated on the old version of the software before the tenant move. Target computing system 120 is the system where the tenant is operated on the new version of the software after the move upgrade. The source computing system 118 includes a runtime component 302 and accesses data from a database persistency layer 304. The target computing system 120 includes a runtime component 306 and accesses data from a database persistency layer 308. The database persistencies 304, 308 store data corresponding to the multi-tenancy computing system 118 or 120 associated with the database persistency. Within the database persistency, data associated with each tenant is isolated from the data associated with other tenants implemented on the corresponding multi-tenancy computing system. Thus, each tenant has its own data, which may be separated by a key field in the tables. The tenant data is persisted in the tables with "client"=<an ID>. A tenant with ID=y can persist its data in source computing system 118 with client="b" 324. During the tenant move from the source computing system 118 to target computing system 120, the tenant ID remains the same while the client number in the database can change. The tenant ID is unique and is used to map the tenant to the customer. The client number may be unique within only one multi-tenancy computing system and may change during a move of the tenant from source computing system 118 to target computing system 120.

Runtime components 302, 306 are used for starting programs that enable a client to access tenant data. Runtime component 302 includes a data extractor 310 and application exits 312, which are implemented in client 324. The data extractor 302 is used to access (both read access and write access) tenant data stored within database persistency 304 (managing data stored in database tables, where the database table has a key field to separate the clients—as described above). Application exits 302 include software routines that enable a movement of data associated with a tenant, that is not identifiable by a generic mechanism, but where application specific mechanisms are used to store tenant specific data in database tables which do not have a client field (e.g. managing data stored in database tables, which do not have a client key field but use a namespace to separate data—see above), that needs to be moved from a source computing system 118 to target computing system 120.

The runtime component 306 includes a move coordinator 314, a data converter 316, and application exits 318. The tenant move procedure is controlled by a move coordinator 314. The move coordinator 314 can run in the target computing system 120 (or the source computing system 118) in the administration client 320 (e.g. client 000, as referred to by SAP). Administration client 320 (which is different than clients 322, 324) is used to run administrative tasks which are not tenant specific. The move coordinator 314 initiates steps to be executed for the move of the tenant from source computing system 118 to target computing system 120, wherein the steps include creating client at the target computing system 120, changing tenant runtime, starting data transfer, starting data migration, etc. Data converter 316 and application exits 318 are implemented in client 322. The data converter 316 is used to access (both read access and write access) tenant data stored within database persistency 308. Application exits 318 include software routines that enable a movement of separated tenant data associated with a tenant that needs to be moved from a source computing system 118 to target computing system 120.

Data structures need to be adjusted during the upgrade to match the new requirements of the new/upgraded version of the software. The adjustments are categorized as: (1) Generic adjustments, and (2) Application specific adjustments.

(1) Generic adjustments: These adjustments can be performed by one program, which defines rules to convert the data. The conversion mechanism used for the conversion of data is identical for all structure changes. For example, (i) new fields are filled with a default value; (ii) Field extension: there are rules determining how to make fields of the different types longer (fill with blank, fill with "0", fill from the left, fill from the right and so on); (iii) Field type conversion: e.g. to convert from an integer to a floating point type, and so on.

The movement of multiple items from source computing system 118 to target computing system 120 is also referred to as "move corresponding," where data from one data structure is moved to another data structure by identifying the fields in the structure according to the field names. Data of structure 1 in field A is move to field A in structure 2, field B of structure 1 to field B of structure 2 and so on. The data types of the fields in structure 1 and structure 2 may be different (then the rules apply as described above) but the names of the fields must be the same. "Move corresponding" which can be implemented in a programming language (e.g. ABAP, an object oriented programming language, and Remote Function Call (RFC), both by SAP AG of Walldorf Germany) and the transport tools. The generic data conversion is performed by the "move corresponding" as one step of the data transfer. "Move corresponding" allows separate data corresponding to different tenants to be moved separately. Subsequent to "move corresponding," the application specific adjustment is performed to migrate the data. The separate data that is moved is stored separately in the target database 308.

(2) Application specific adjustments: These application specific adjustments require logic and are performed by executing a program provided by the application (e.g. "XPRA" provided by SAP). For example, a new field may be added, and the value may be computed out of two existing old fields. Subsequent to "move corresponding," the application specific adjustment is performed to migrate the data from the source computing system 118 to target computing system 120. The separate data that is moved is stored separately in the target database 308.

The order of the above-described adjustments is similar to the sequence of steps in current upgrade where first the generic structure conversion is performed and subsequently (optional step), semantic conversion is performed.

The data transfer is executed as follows.

(1) The data is "pulled" to the target computing system 120 by a software routine called data converter 316.

(2) Data is extracted from the source tenant by a software routine called data extractor 310 running on the source computing system 118 in the client 324 where the data shall be extracted from ("client=b"). The data extractor 310 is a module that manages data generically. For content specific treatment, application exits 312 can be plugged into the data extractor 310. Application exits 312 include software routines that enable a movement of separated tenant data associated with a tenant that needs to be moved from a source computing system 118 to target computing system 120.

(3) The data is read from the data extractor 310 by the data converter 316. Currently, this reading of the data this is performed using a remote function call (RFC, as referred by SAP). Data which is extracted by an application exit and is stored data for the transfer in a format that requires post processing 410 is passed to the application exit 318 on the target computing system 120 to write the data to the database persistency 308.

(4) "Application Exits" are used to extract (and write) data which belongs to the tenant but is stored in client independent tables. The repository is client independent. Each tenant has its own namespace. Other mechanisms may be envisioned to identify tenant specific data in client independent tables (e.g. storing the keys of the data which is persisted in a client independent table for identification purpose in a client dependent table as well to enable the Application Exit to find the data).

Thus, using the architecture illustrated in FIG. 3, an individual tenant can be upgraded by movement (also referred to as "copying" 401) of the individual tenant from a source computing system 118 that implements an application platform 402 associated with an older version 404 (e.g. version 2.0) of software to a target computing system 120 that implements an application platform 406 associated with a newer version 408 (e.g. version 3.0) of the software. Thus, a tenant can be individually upgraded rather than the conventional method of upgrading all tenants of a multi-tenancy computing system at once instead of individually. The individual upgrade is possible by a movement of the tenant from a source computing system 118 that implements an application platform 402 associated with an older version 404 (e.g. version 2.0) of software to a target computing system 120 that implements an application platform 406 associated with a newer version 408 (e.g. version 3.0) of the software.

Figure 4:
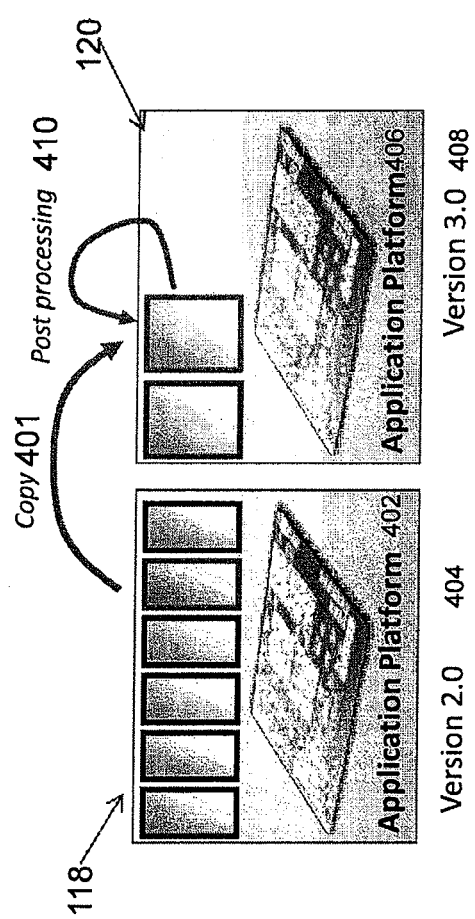
FIG. 4 illustrates movement/copying of a tenant from the source computing system that implements an older version of software to a target computing system that implements a newer version of the software.

FIG. 4 illustrates a movement (also referred to as "copying" 401) of a tenant from a source computing system 118 that implements an application platform 402 associated with an older version 404 (e.g. version 2.0) of software to a target computing system 120 that implements an application platform 406 associated with a newer version 408 (e.g. version 3.0) of the software. During the copy 401, all customer-specific data is also moved from the source computing system 118 to target computing system 120. Although the source computing system 118 and target computing system 120 are described as implementing different versions of software, in some implementations, the target computing system 120 can have a different version (or even type) of any one or more of database, kernel, programming language basis software, and application software rather than just software.

Figure 5:
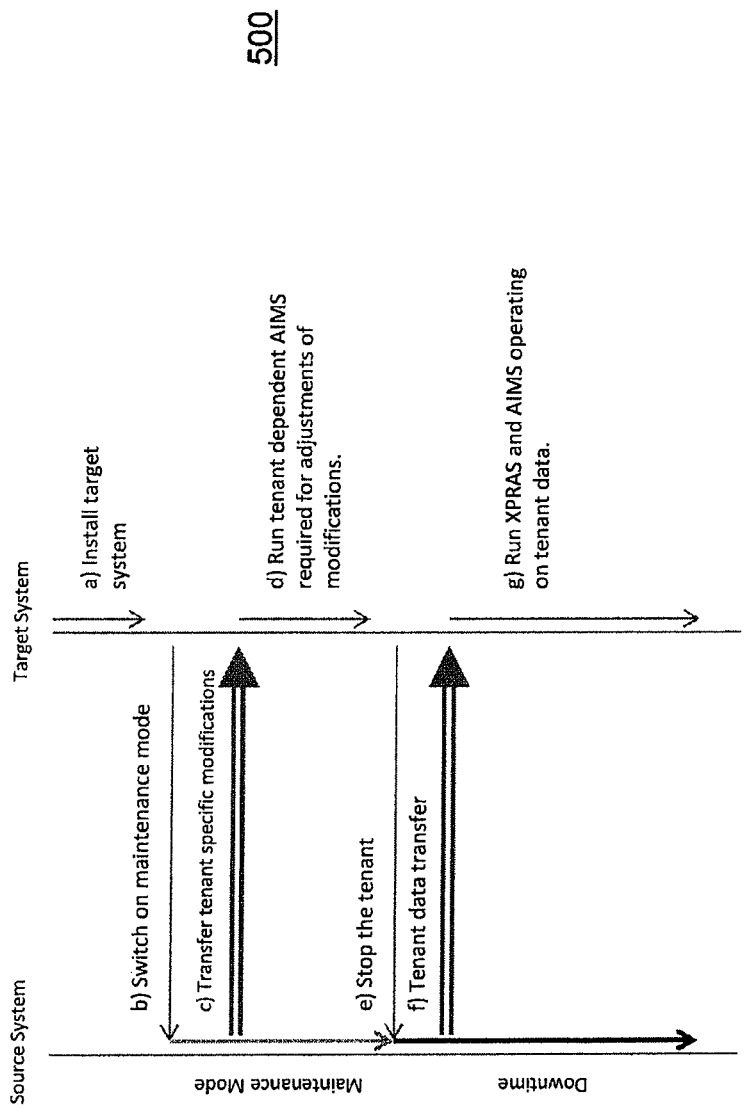
FIG. 5 illustrates a tenant move upgrade process for movement of a tenant from a source computing system associated with an older software version to a target computing system associated with a newer software version.

FIG. 5 illustrates a tenant move upgrade process 500 for movement of a tenant from a source computing system 118 associated with an older software version 404 to a target computing system 120 associated with a newer software version 408. The tenant move upgrade process 500 includes the following steps, as illustrated in FIG. 5:

a) Install system on a new release

The following steps are repeated for each tenant on the start release system (except the administration client):

b) Put the tenant to maintenance mode/read-only mode
c) Transfer repository data (that data, which cannot be changed any longer due to maintenance mode and that is required to prepare the application data move)
d) Adjust the repository data transferred to the new release
e) Lock the source tenant against customer usage
f) Transfer the business data
g) Migrate the data transferred to the structure required by the new release
h) Enable customers to logon to the target computing system 120.

Figure 6:
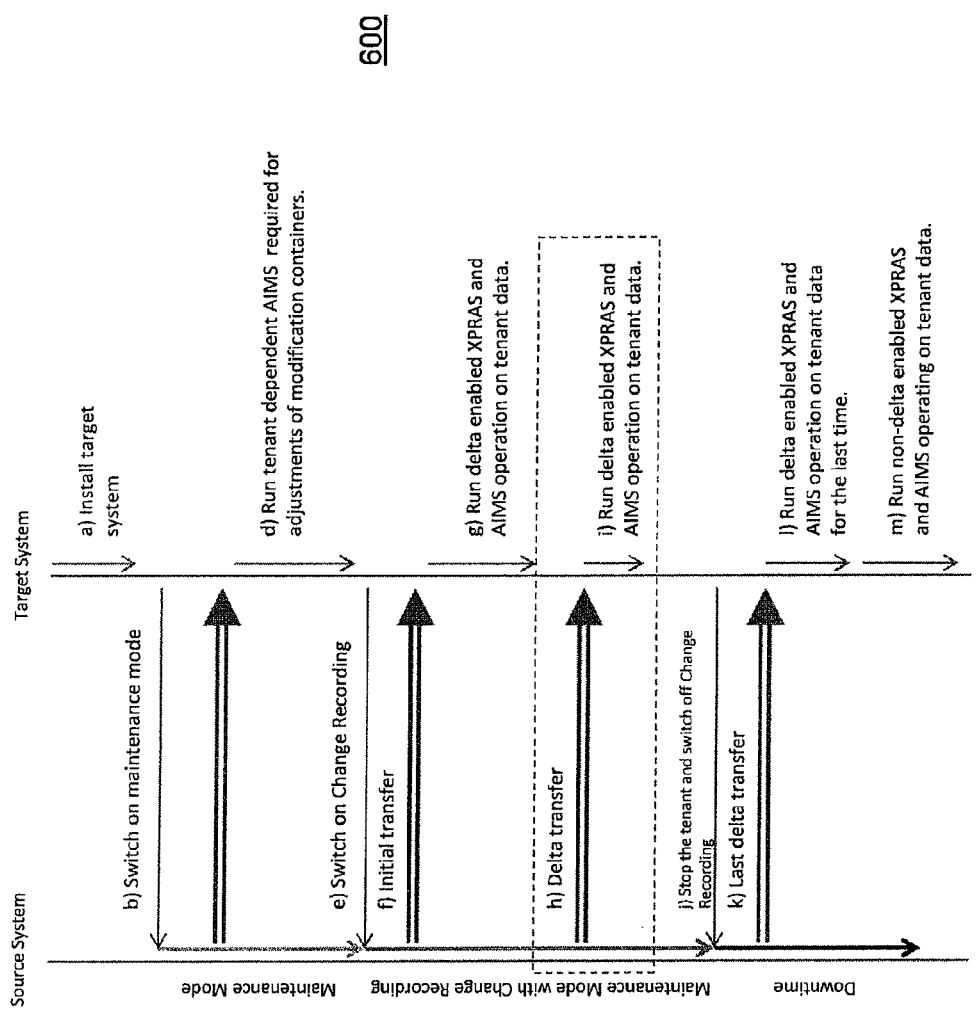
FIG. 6 illustrates an optimized tenant move upgrade process for movement of a tenant from a source computing system associated with an older software version to a target computing system associated with a newer software version.
Figure 7:
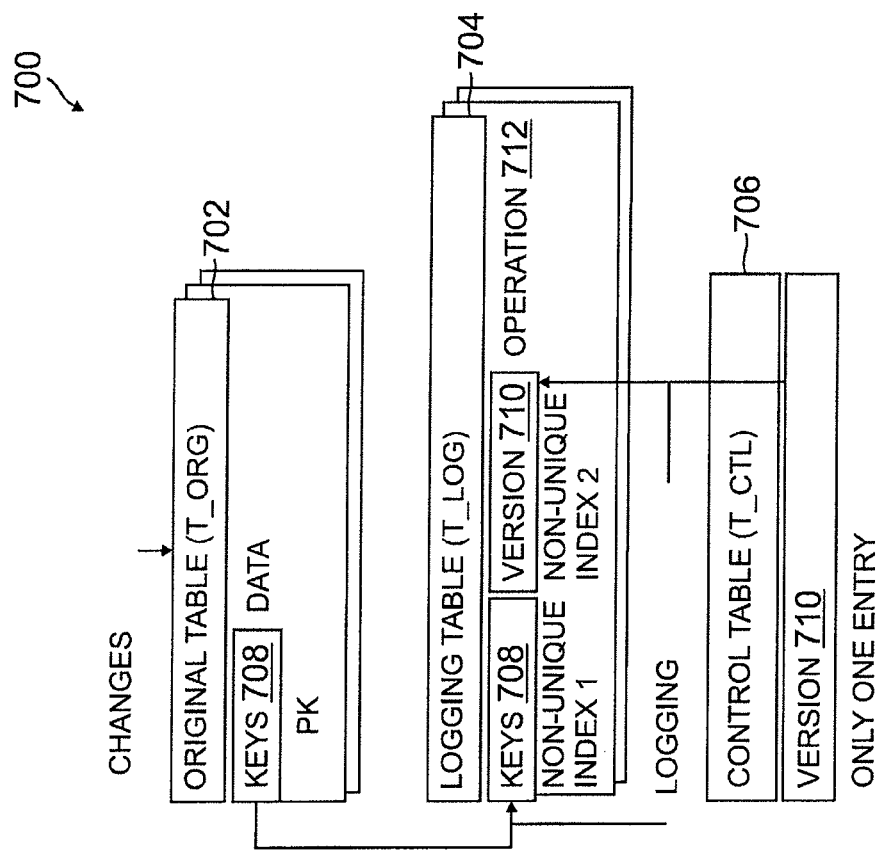
FIG. 7 illustrates logging infrastructure.

FIG. 6 illustrates a tenant move upgrade process 600 for movement of a tenant from a source computing system 118 associated with an older software version 404 to a target computing system 120 associated with a newer software version 408. The tenant move upgrade process 600 is an optimized process that has a shorter downtime due to the addition "change recording & replay," which is a part of the tenant move upgrade process 600. The tenant move upgrade process 600 includes the following steps, as illustrated in FIG. 6:

a) Install system on a new release.

The following steps are repeated for each tenant on the start release system (except the administration client):

b) Put the tenant to maintenance mode/read-only mode.
c) Transfer repository data (data that cannot be changed any longer due to maintenance mode and that is required to prepare the application data move.)
d) Adjust the repository data transferred to the new release.
e) Switch on change recording.
f) Transfer the business data, which is an initial chunk.
g) Migrate the data to the new structure.
h) Transfer the business data, second chunk (the data which had been recorded since the initial chunk data transfer had started (step f).
i) Migrate the delta data transferred in step h to the new structure.
j) Lock the source tenant against customer usage and stop change recording.
k) Transfer the last chunk, the business data recorded since step h started.
l) Migrate the data transferred in step k.
m) For data, where there is no "delta migration" as required in steps i and l, migrate the data now during downtime completely.
n) Enable customers to logon to the target computing system 120.

The changes created within the database by the customer still using the "old" system are recorded, transferred to the new system and re-played. The upgrade-actions running on the application data are also repeated for the incrementally re-played data. This described approach allows planning the tenant upgrade of individual tenants. The timeslot can be negotiated for each customer individually.

The described implementations enable execution of the upgrade procedure for individual tenants. If one tenant move upgrade fails, other tenants are not affected. The success rate of the tenant upgrade is thus only dependent on the fail rate of one tenant and is not dependent on the fail rate of all tenants in one multi-tenancy computing system. The likelihood that the upgrade of one tenant is successful is thus much larger than likelihood of upgrade of all tenants of a system. Therefore, the presented implementations are clearly advantageous than conventional implementations where all tenants must get upgraded all together. In addition, the tenant move procedure allows de-coupling the "application upgrade" again from a database upgrade, as is possible with a "three-tier-client-server" architecture. The data is extracted from an old database and transferred to a new database using a remote function call (RFC). Thus, only the RFC needs to remain compatible.

The following description describes in detail the procedure for movement of a tenant from a source computing system 118 associated with an older software version 404 to a target computing system 120 associated with a newer software version 408.

Install the target release system. The installation of the target release system includes the following steps:

(1) Install the system including the information required for the tenant move upgrade later.
(2) Deploy corrections to the system (updating the information required for the tenant move).
(3) Deploy all required add-ons which are present on the start release system in a compatible new version (or the successor). If it is not a compatible successor, the add-on specific upgrade actions must be brought to the target system as well.

In the following, [source] specifies that associated step is executed on the source computing system 118, and [target] specifies that associated step is executed on the target computing system 120.

Procedure to Move-Upgrade One Tenant:

[target] Step 01: Create empty client

Create new client: T000 entry.

Create "table space for client" in database

Optionally, run a free space check in the target system storage, that there is enough free database volume to take the tenants data

[source] Step 02: Put Tenant to maintenance mode

The maintenance mode disables changes in the repository tables.

System wide blocking against corrections and deploying new Add-ons. Tenant local lock of development repository objects Optionally, system wide blocking against system stop, ensuring no interference with the tenant upgrade move procedure.

[source] Step 03: Tenant repository data transfer

Call the tenant move application exits on the source side to extract tenant data from the client independent repository tables.

The data needs to be stored with structure information and source system version in a client dependent container table.

[target] Step 04: Repository post-processing

Extract the data from the container. The application exits need to be enabled to identify potentially additional operations, since the format of the data might be different and semantic conversion might be required (hence the structure and version information).

Upgrade actions on the repository objects. UI load generation including customer individualization. Customer extensibility generation. Business configuration upgrade.

[source] Step 05: Tenant Shutdown

Log off users from the tenant

Stop the tenant and all related processes.

Downtime starts

[source] Step 06: Tenant data transfer
Call the tenant move "application exits" on the source side to extract tenant data from the client independent non-repository tables. The data needs to be stored with structure information and source system version in a client dependent container table.
[target] Step 07: Tenant data post processing
Transfer the tenant data to the new system, including conversion of the data structure to the format required by the new software.
Call tenant move "application exits" to extract the data from the transportation container and import them to the database.
Upgrade actions related to the customer data:
Import data into the tenant which is shipped by the software vendor for client dependent tables. "Client cascade during R3trans import." See below.
After-import methods to be run in client as a subsequent step to the data import.
Data migration "XPRA."
Technical delta configuration.
[target] Step 07a: Tenant data post processing
Tenant backup
If done using RFC, all changes should be in the database redo logs.
[target] Step 08: Tenant startup
Set runlevel to started.
Notify web-dispatcher to route client access to new system
Enable customer login
[source] Step 09: Delete Tenant
Delete the tenant data in the source computing system 118, once the customer reported, the tenant in the new system works and a fallback to the previous version is not required.
Change Recording and Replay:
Record and replay needs to enable the following steps. All changing CRUD (create, update, delete) operations need to be logged. Subsequent changes to the same key (or to the same persistent object identified by the key) need to be logged in a manner that a replay will provide the correct result (imagine a sequence of "create, update, delete" resulting in "no entry" whereas "delete, create, update" resulting in a data entry to be transferred). The record shall work in "chunks" which allows transfer of data from the previous chunk while recording continues.

There is a number of possible methods for implementing the record and replay which can be integrated with the tenant move procedure, including database triggers, methods based on database log mining, specific methods implemented on application level or special external tools available on the market.

Additionally, the data migration programs (XPRA) can be integrated with recording and replay mechanism to further reduce the downtime required by the tenant move procedure through subsequent adjustment of data packets delivered by the replay.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method to individually upgrade a tenant in a multi-tenancy computing environment to a new version of a software, the method comprising:
starting, using one or more processors, a tenant at a source computing system that implements a version of the software, the source computing system comprising a database including client dependent tables, client independent repository tables, and client independent non-repository tables;
receiving, using the one or more processors, in response to a change of the version of the software, a request for the upgrade of the tenant;
stopping, using the one or more processors and in response to the received request, the tenant at the source computing system;
moving, using the one or more processors, the tenant from the source computing system to a target computing system that implements a newer version of the software, the moving of the tenant comprising a first movement of tenant specific data stored in the client dependent tables, a second movement of tenant specific data extracted from the client independent repository tables, and a third movement of tenant specific data extracted from the client independent non-repository tables, the first movement, the second movement, and the third movement being separate from each other, the second movement and the third movement of tenant specific data being enabled by application exits that are used to extract the tenant specific data from the client independent repository tables and the client independent non-repository tables, the application exits being software routines implemented at pre-defined phases of the moving of the tenant; and
starting, using the one or more processors, the moved tenant at the target computing system.

2. The method in accordance with claim 1, wherein the starting of the tenant at the source computing system includes accessing a same instance of a software application as being accessed by other tenants at the source computing system.

3. The method in accordance with claim 1, wherein the stopping of the tenant at the source computing system disables the tenant from accessing a software application as being accessed by other tenants at the source computing system.

4. The method in accordance with claim 1, wherein the moving of the tenant includes a separate movement of customer-specific data associated with the tenant.

5. The method in accordance with claim 4, wherein the customer-specific data associated with each tenant is stored separately in a database persistency layer that is accessed by an application server at the source computing system.

6. The method in accordance with claim 4, wherein the customer-specific data associated with each tenant is stored separately in a database persistency layer that is accessed by an application server at the target computing system.

7. The method in accordance with claim 1, wherein:
the client independent tables comprise tables storing the software that is presented to a user of the software, content of the software that is presented to the user, and default configuration of the software; and
the client dependent tables comprise content specific to users of the software, the content specific to the users of the software comprising user administration data specific to the users, business data specific to the users, business configuration specific to the users, runtime data specific to the users, and log information specific to the users.

8. The method in accordance with claim 1, wherein the first movement, the second movement, and the third movement occurs at separate respective times.

9. A computer program product comprising a non-transitory machine-readable medium storing instructions that, when executed by at least one programmable processor, cause the at least one programmable processor to perform operations comprising:

starting a tenant at a source computing system that implements a version of the software, the source computing system comprising a database including client dependent tables, client independent repository tables and client independent non-repository tables;

receiving, in response to a change of the version of the software, a request for the upgrade of the tenant;

stopping, in response to the received request, the tenant at the source computing system;

moving the tenant from the source computing system to a target computing system that implements a newer version of the software, the moving of the tenant comprising a first movement of tenant specific data stored in the client dependent tables, a second movement of tenant specific data stored in the client independent repository tables, and a third movement of tenant specific data stored in the client independent non-repository tables, the first movement, the second movement, and the third movement being separate from each other, the second movement and the third movement of tenant specific data being enabled by application exits that are used to extract the tenant specific data from the client independent repository tables and the client independent non-repository tables, the application exits being software routines implemented at pre-defined phases of the moving of the tenant; and starting the moved tenant at the target computing system.

10. A computer program product in accordance with claim 9, wherein the start of the tenant at the source computing system includes accessing a same instance of a software application as being accessed by other tenants at the source computing system.

11. The computer program product in accordance with claim 9, wherein the stop of the tenant at the source computing system disables the tenant from accessing a software application as being accessed by other tenants at the source computing system.

12. The computer program product in accordance with claim 1, wherein the move of the tenant includes a separate movement of customer-specific data associated with the tenant.

13. The computer program product in accordance with claim 12, wherein the customer-specific data associated with each tenant is stored separately in a database persistency layer that is accessed by an application server at the source computing system.

14. The computer program product in accordance with claim 12, wherein the customer-specific data associated with each tenant is stored separately in a database persistency layer that is accessed by an application server at the target computing system.

15. A system comprising:

at least one programmable processor; and a non-transitory machine-readable medium storing instructions that, when executed by the at least one processor, cause the at least one programmable processor to perform operations comprising:

starting a tenant at a source computing system that implements a version of the software, the source computing system comprising a database including client dependent tables, client independent repository tables, and client independent non-repository tables;

receiving, in response to a change of the version of the software, a request for the upgrade of the tenant;

stopping, in response to the received request, the tenant at the source computing system;

moving the tenant from the source computing system to a target computing system that implements a newer version of the software, the moving of the tenant comprising a first movement of tenant specific data stored in the client dependent tables, a second and another movement of tenant specific data extracted from the client independent repository tables, and a third movement of tenant specific data extracted from the client independent non-repository tables, the first movement, the second movement, and the third movement being separate from each other, the second movement and the third movement of tenant specific data being enabled by application exits that are used to extract the tenant specific data from the client independent repository tables and the client independent non-repository tables, the application exits being software routines implemented at pre-defined phases of the moving of the tenant; and starting the moved tenant at the target computing system.

* * * * *